United States Patent [19]

Senjo et al.

[11] Patent Number: 5,720,202
[45] Date of Patent: Feb. 24, 1998

[54] ACTUATOR

[75] Inventors: Motohiro Senjo; Shigeru Sadotomo, both of Shimizu, Japan

[73] Assignee: IAI Corporation, Shizuoka, Japan

[21] Appl. No.: 558,263

[22] Filed: Nov. 13, 1995

[51] Int. Cl.$^6$ .................................................. F16H 25/20
[52] U.S. Cl. ................................. 74/89.15; 74/424.8 R; 384/53
[58] Field of Search ........................... 74/89.15, 424.8 R; 384/53

[56] References Cited

U.S. PATENT DOCUMENTS

| | | | |
|---|---|---|---|
| 3,728,903 | 4/1973 | Haller | 74/89.15 |
| 4,878,390 | 11/1989 | Hauser | 74/89.15 |
| 5,251,501 | 10/1993 | Katahira | 74/89.15 |
| 5,531,557 | 7/1996 | Springer | 74/89.15 X |

FOREIGN PATENT DOCUMENTS

| | | |
|---|---|---|
| 1-247862 | 10/1989 | Japan . |
| 2-66359 | 3/1990 | Japan ........ 74/89.15 |
| 2-72254 | 3/1990 | Japan ........ 74/89.15 |

*Primary Examiner*—Allan D. Herrmann
*Attorney, Agent, or Firm*—Sughrue, Mion, Zinn, Macpeak & Seas, PLLC

[57] ABSTRACT

An actuator designed in such a way that a feed screw having both ends respectively supported in a rotatable manner by a pair of bearing members arranged on a base is moved in the proper direction by a rotary driver, and as a feed nut engaged with the feed screw with its rotation being restricted by the feed screw is moved in accordance with the rotation of the feed screw, a slider attached to the feed nut is moved. A pair of support members are provided midway between the slider and the bearing members located on both sides of the slider and are movable in a feeding direction. The support members support the feed screw while their postures are restricted in a direction perpendicular to the feeding direction. The support members are coupled by first coupling means. Rotary bodies are respectively attached to the support members in a rotatable manner, with a thread member put around those rotary bodies. The thread member has both ends coupled to the slider and has its center portion secured to the base. The actuator is further provided with second coupling means for setting the moving speed of the support members to a half of that of the slider.

8 Claims, 7 Drawing Sheets

5,720,202

1
ACTUATOR

BACKGROUND OF THE INVENTION

1. Field of the Invention

The present invention relates to an actuator which moves a slider, secured to a feed nut engaged with a feed screw, via this feed nut by causing a rotary driver to rotate the feed screw in the proper direction. More particularly, this invention relates to an actuator which is so designed as to exhibit stable operation.

2. Description of the Related Art

One known actuator has a structure as shown in, for example, FIG. 13. The actuator has a base 201 on which a ball screw 203 is mounted. The ball screw 203 has both ends rotatably supported by bearing members 205 and 207 placed on the base 201. The ball screw 203 is coupled via a coupling mechanism (not shown) to the output shaft of a servo motor 209.

Engaged with the ball screw 203 is a ball nut 211 to which a slider 213 is attached. This slider 213 comprises a slider body 215 and a guide block 217 attached to this slider body 215. Provided on the base 201 is a rail 219 with which the guide block 217 is engaged in a movable fashion.

With the above structure, when the servo motor 209 rotates in the proper direction, the ball screw 203 rotates in the same direction. The rotation of this ball screw 203 allows the ball nut 211, whose rotation is restricted, to move in the proper direction. As the ball nut 211 moves, the slider 213 moves in the same direction.

The actuator having the above structure has the following shortcomings. The ball screw 203 of this actuator, which converts the rotational movement to a linear movement, has a natural frequency f. In the area where the number of rotations of the ball screw 203 coincides with the natural frequency f, therefore, the ball screw 203 vibrates greatly. This natural frequency f is determined by the length and diameter of the ball screw 203, the supporting states of the ball screw 203 at its ends, and the like. It is therefore necessary to set the number of rotations so that the ball screw 203 does not resonate with respect to the natural frequency f of the ball screw 203.

The natural frequency f of the shaft is generally obtained from the following equation (I).

$$f = \lambda^2/2\pi L^2 \sqrt{(E \cdot I)/(A \cdot \rho)} \quad \text{(I)}$$

where
L: distance between attached points
E: vertical elastic coefficient
I: minimum secondary moment of the cross section of the screw shaft
A: the cross-sectional area of the screw shaft, and
ρ: material density.

80% of the natural frequency f obtained from the equation (I) is set as the allowable number of rotations n. A further consideration will be given on this point with reference to the assembled state as exemplified in FIG. 14.

Same reference numerals as used for the components in FIG. 13 are also given to those in FIG. 14 which are identical to the former components.

With the assembled state as shown in FIG. 14, the natural frequency f becomes minimum when the distance B in the diagram becomes maximum. The allowable number of rotations n at that time becomes as expressed by the following equation (II).

2

$$n = \alpha \cdot 60 \cdot \lambda^2/2\pi L^2 \sqrt{(E \cdot I)/(A \cdot \rho)} \quad \text{(II)}$$

where
λ: 3.927
α: 0.8.

The resonance-originated vibration can be suppressed by setting the number of rotations of the ball screw 203 to such a value so as not to cause resonance with respect to the natural frequency f of the ball screw 203 or a value equal to or smaller than 80% of the natural frequency f. The equations (I) and (II) show that the allowable number of rotations n falls to ¼ if the length L of the ball screw 203 becomes doubled while the cross-sectional area A of the screw shaft of the ball screw 203 remains the same. This is an obstacle in improving the machine speed.

One possible way of coping with this problem is to increase the allowable number of rotations by providing supports between the ball nut 211 and the bearing member 207 and between the ball nut 211 and the bearing member 205 in the assembled state as shown in FIG. 13 and thus increasing the natural frequency f of the ball screw 203 itself.

One example of such a scheme is illustrated in FIG. 15. The structure in FIG. 15 includes an intermediate support 221 attached on the base 201 to support the ball screw 203. This intermediate support 221 may interfere with the movement of the ball nut 211, the slider 213 and so forth which move as the ball screw 203 rotates. In this respect, a limit switch 223 is provided as illustrated in FIG. 15 to detect the approach of the ball nut 211, the slider 213 and so forth which move according to the movement of the ball screw 203. When such an approach is detected, therefore, the intermediate support 221 is retracted to the standby position.

Another example is disclosed in Unexamined Japanese Patent Publication No. Hei 1-247862 corresponding to German Patent Application No. DE P38 04 117.0. The structure described in this publication has a recess previously formed midway in the base to receive a support member so that the support member is positioned there by means of a spring. When the slider hits against the support member, it disengages the support member from the spring and moves the support member.

This conventional structure, however, has the following shortcoming. The structure shown in FIG. 15 is complicated and inevitably enlarges the actuator. In other words, this structure should have the intermediate support 221 and the limit switch 223 both provided on the base 201 and should further have some activation member provided on the slider 213 to activate the limit switch 22 in addition to the driving mechanism for the retraction and protraction of the intermediate support 221.

Further, because of the use of the elastic force of the spring, the structure described in Unexamined Japanese Patent Publication No. Hei 1-247862 needs the application of external force to disengage the support member. The external force is produced by the movement of the slider in the structure described in Unexamined Japanese Patent Publication No. Hei 1-247862. When the slider moves too fast in this case, the impact of the moving slider on the support device at the time of the disengagement is likely to generate noise and vibration.

SUMMARY OF THE INVENTION

Accordingly, it is an object of the present invention to provide an actuator with an intermediate support mechanism, which is simple in structure and is small in size, and does not generate shocks.

3

To achieve the above object, an actuator according to this invention comprises a feed screw having both ends respectively supported in a rotatable manner by a pair of bearing members arranged on a base;

a rotary driver for rotating the feed screw in a proper direction;

a feed nut engaged with the feed screw with rotation thereof being restricted by the feed screw, and movable in accordance with rotation of the feed screw;

a slider attached to the feed nut;

a pair of support members, located midway between the slider and the bearing members on both sides of the slider and movable in a feeding direction, for supporting the feed screw while positions of the support members are restricted in a direction perpendicular to the feeding direction; and coupling means for coupling the base, the slider and the pair of support members in such a manner that at a time the slider moves, a moving speed of the pair of support members becomes a half of that of the slider.

The coupling means may comprise first coupling means including a pair of first rotary bodies rotatably secured to both end portions of the base in the feeding direction and a first thread member placed around the pair of first rotary bodies and having both ends coupled to the pair of support members, and second coupling means including a pair of second rotary bodies rotatably secured to the pair of support members and a second thread member placed around the pair of second rotary bodies and having both ends coupled to the slider and a center portion secured to the base.

Alternatively, the coupling means may comprise first coupling means which is a rod member for coupling the pair of support members, and second coupling means including a pair of rotary bodies rotatably secured to the pair of support members and a thread member placed around the pair of rotary bodies and having both ends coupled to the slider and a center portion secured to the base.

Each of the support members may comprise a support member body, a guide section attached to the support member body and movably engaged with a rail laid on the base, and a feed screw support attached to the support member body, the feed screw penetrating the feed screw support.

Each of the support members may comprise a support member body, a guide section attached to the support member body and movably engaged with a rail laid on the base, and a feed screw support attached to the support member body in such a way as to be movable in an axial direction, relative to the support member body within a predetermined range, the feed screw penetrating the feed screw support; and the bearing members and the slider may abut on each other via the feed screw supports of the support members at moving ends while the support member bodies contact neither the bearing members nor the slider.

Each of the feed screw supports may have a flange on one end side and a stopper ring on the other end side, given that distances between the flanges and the stopper rings are J and axial lengths of the support member bodies are H, J=H+α is satisfied, and the support member bodies and the feed screw supports are movable in a relative fashion within a range of the α.

The lengths of the thread members of the first coupling means and the second coupling means may be determined in such a way that distances between the support member bodies and the flanges and distances between the support member bodies and the stopper rings become ½α.

4

According to the actuator of this invention, the support mechanism with a simple structure for the feed screw can be attained without complicating the structure of the actuator or enlarging the actuator. The natural frequency of the feed screw can be increased, thus increasing the allowable number of rotations of the feed screw. This design can contribute to easily improving the machine speed.

As the pair of support members are moved at a half the moving speed of the slider, the support members can effectively support the feed screw over the entire moving range of the slider without contacting the slider.

In the case where the support members are provided with the feed screw supports which are movable in the axial direction of the support members, even if there is a slight error in the positional adjustment between the slider, the support members and the bearing members, this error can be compensated by the movement of the feed screw supports, thus facilitating the work for the positional adjustment.

DETAILED DESCRIPTION OF THE PREFERRED EMBODIMENTS

First Embodiment

The first embodiment of the present invention will now be described with reference to FIGS. 1 through 5.

In this embodiment, this invention is adapted to an actuator which uses a ball screw and a ball nut as a screw and a feed nut.

Figure 1:
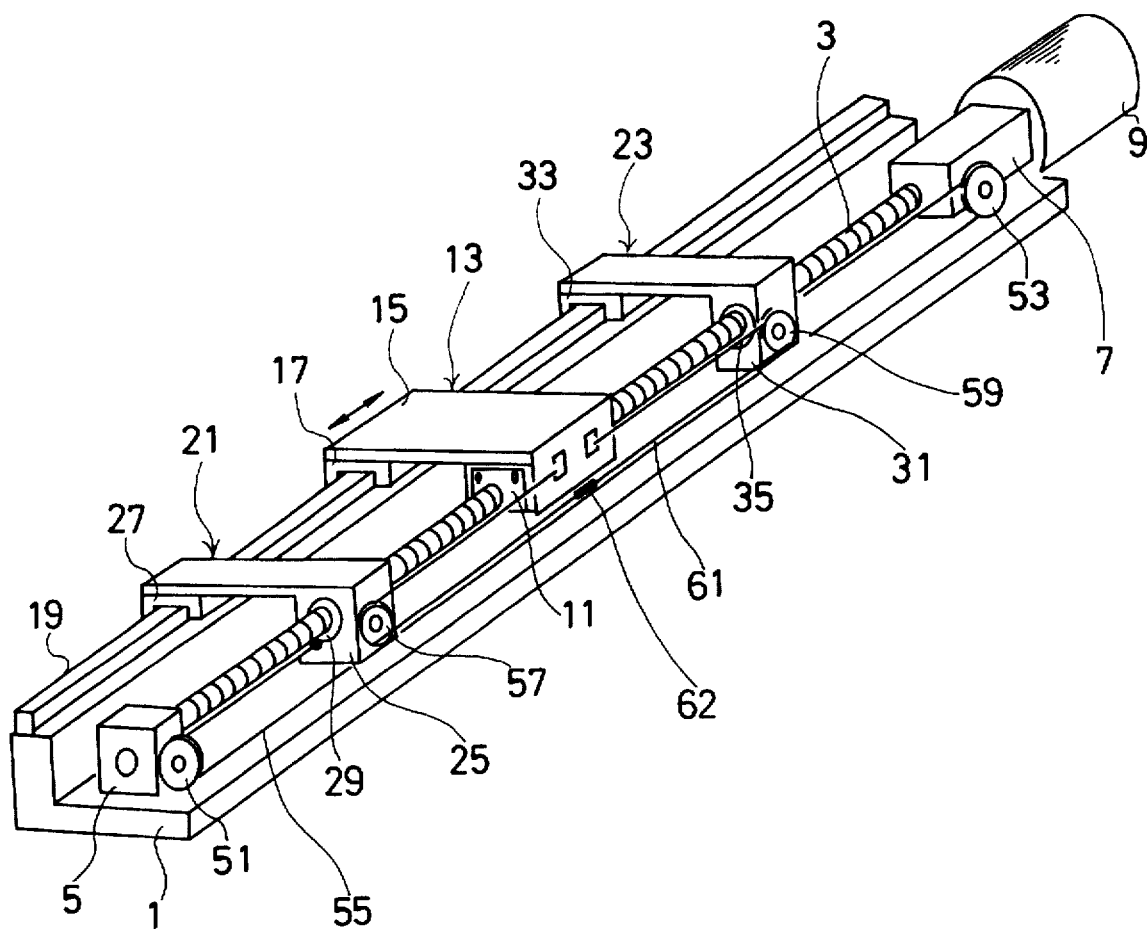
FIG. 1 is a perspective view showing the general structure of an actuator according to a first embodiment of the present invention.

As shown in FIG. 1, the actuator has a base 1 on which a ball screw 3 as the feed screw is mounted. The ball screw 3 has both ends rotatably supported by bearing members 5 and 7. The ball screw 3 is coupled via a coupling mechanism (not shown) to the output shaft of a servo motor 9 as a rotary driver. Engaged with the ball screw 3 is a ball nut 11 to which a slider 13 is attached. This slider 13 comprises a slider body 15 and a guide block 17 attached to this slider body 15.

Laid on the base 1 is a rail 19 with which the guide block 17 is engaged in a movable fashion. When the servo motor 9 rotates in the proper direction, the ball screw 3 rotates in the same direction. In accordance with the rotation of this ball screw 3, the ball nut 11 whose rotation is restricted, moves in the proper direction. As the ball nut 11 moves, the slider 13 moves in the same direction.

Support brackets 21 and 23 as support members are respectively provided on both sides of the slider 13. The support bracket 21 comprises a bracket body 25 and a guide block 27 attached to this bracket body 25. The ball screw 3 penetrates through the bracket body 25. The guide block 27 is movably engaged with the rail 19 on the base 1. A support bushing 29 is provided on that portion of the bracket body 25 where the ball screw 3 penetrates. This support bushing 29 has its inside diameter set slightly larger than the outside diameter of the ball screw 3.

The same structure is employed on the side of the support bracket 23. The support bracket 23 comprises a bracket body 31 and a guide block 33 attached to this bracket body 31. The ball screw 3 penetrates through the bracket body 31. The guide block 33 is movably engaged with the rail 19 on the base 1. A support bushing 35 is provided on that portion of the bracket body 31 where the ball screw 3 penetrates. This support bushing 35 has its inside diameter set slightly larger than the outside diameter of the ball screw 3.

The support bracket 21 is located midway between the bearing member 5 and the slider 13. The support bracket 23 is likewise located midway between the bearing member 7 and the slider 13.

A pulley 51 is rotatably attached as a rotary body to the bearing member 5, and a pulley 53 is likewise rotatably attached as a rotary body to the bearing member 7. A belt 55 as a thread member is placed around the pulleys 51 and 53 and has its both ends respectively coupled to the bracket body 25 of the support bracket 21 and the bracket body 31 of the support bracket 23. The pulleys 51 and 53 and the belt 55 constitute the first coupling means.

A pulley 57 as a rotary body is rotatably attached to the bracket body 25 of the support bracket 21. A pulley 59 as a rotary body is likewise rotatably attached to the bracket body 31 of the support bracket 23. A belt 61 as a thread member is placed around the pulleys 57 and 59 and has its both ends coupled to the slider body 15 of the slider 13. The middle portion of the belt 61 is secured to the base 1. The fixing portion is indicated by reference numeral "62" in FIGS. 1 and 2. Available methods of securing the belt 61 to the base 1 include a way of fixing the belt 61 against the base 1 by means of an unillustrated metal fitting (with a stop screw to be fastened into the base 1), and a way of separating the belt 61 at the fixing portion and fixing the end portions of the separated portions of the belt 61 against the base 1 by means of metal fittings (with stop screws to be fastened into the base 1). The pulleys 57 and 59 and the belt 61 constitute the second coupling means.

Figure 2:
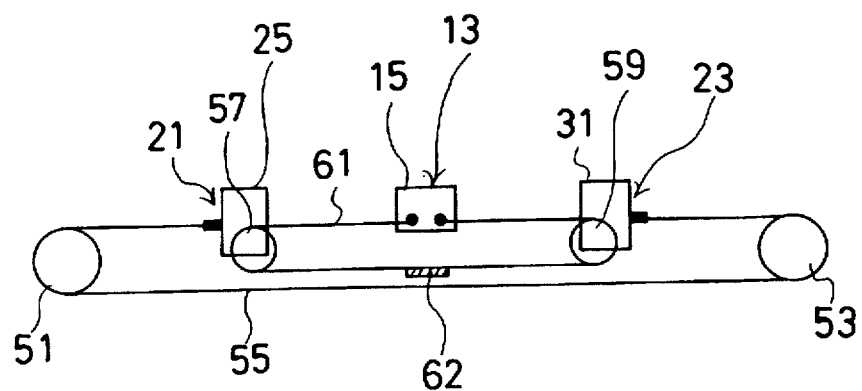
FIG. 2 is a diagram exemplarily showing the structure of a part of the actuator according to the first embodiment of this invention.

FIG. 2 exemplarily shows the structures of the pulleys 51, 53, 57 and 59 and the belts 55 and 61.

With this structure, when the support brackets 21 and 23 move away from each other, tension is produced on the belt 61 to restrict the separation as shown in FIG. 2. When the support brackets 21 and 23 move closer to each other, tension is produced on the belt 55 to restrict this approach as shown in FIG. 2. As a result, the support brackets 21 and 23 can keep a given distance therebetween.

Figure 3:
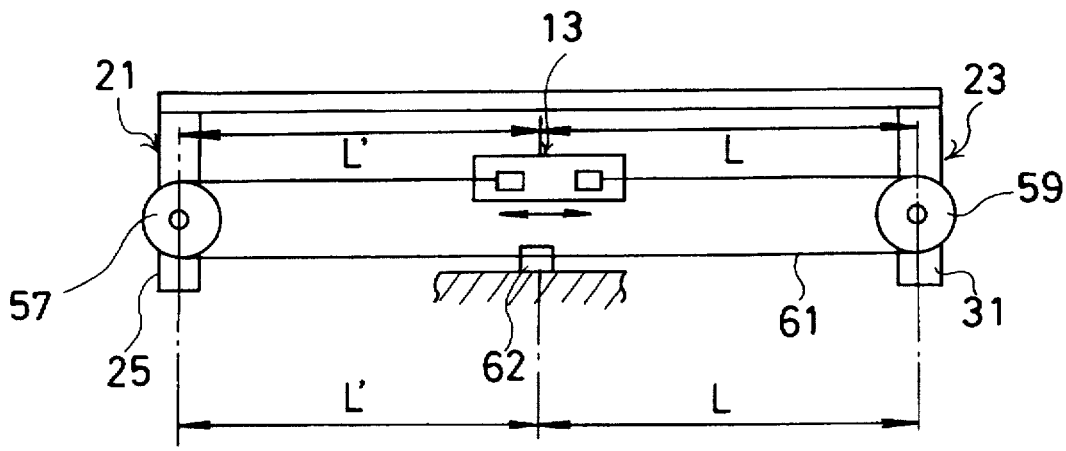
FIG. 3 is a diagram for explaining the first embodiment and the principle of making the moving speed of the support members a half of the moving speed of a slider.
Figure 4:
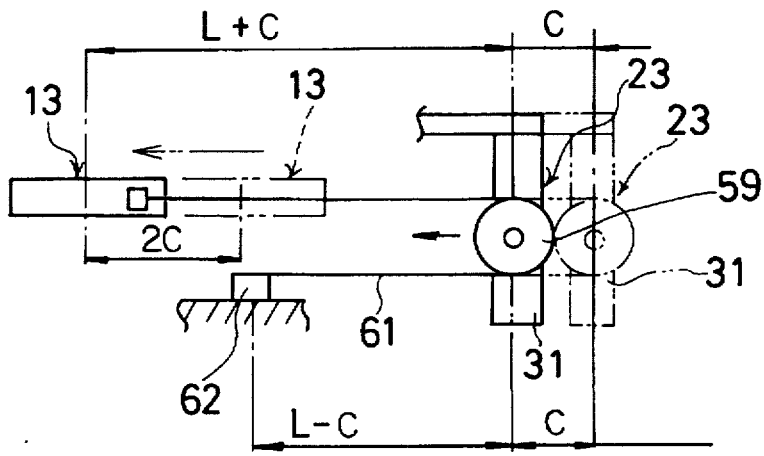
FIG. 4 is a diagram for explaining the first embodiment and the principle of making the moving speed of the support members a half of the moving speed of the slider.
Figure 5:
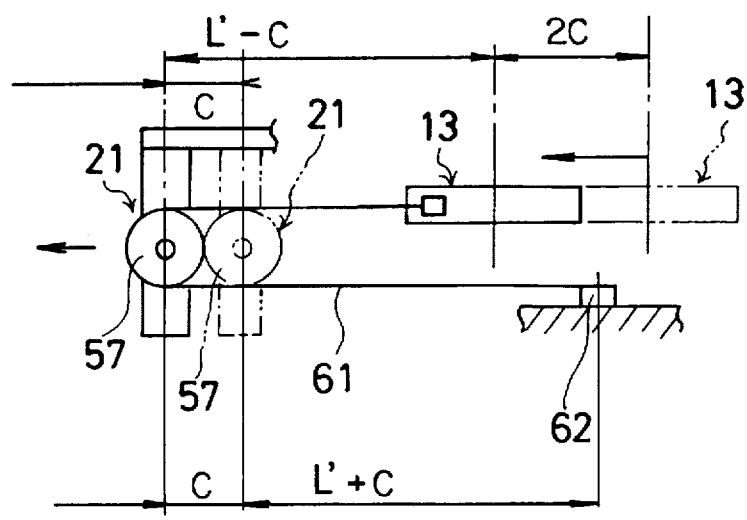
FIG. 5 is a diagram for explaining the first embodiment and the principle of making the moving speed of the support members a half of the moving speed of the slider.

The principle of making the moving speed a half will now be discussed with reference to FIGS. 3 through 5. It is assumed that the initial state is as illustrated in FIG. 3. Suppose that the slider 13 has moved leftward in FIG. 4 by 100 mm from the initial state. Because the length of the belt 61 stretched between the slider 13 and the base 1 is constant, the length of the belt 61 between the slider 13 and the pulley 59 on the right side of the slider 13 becomes (L+50) mm (wherein 50 mm is the constant C, as shown in FIGS. 4 and 5), and the length of the belt 61 between the pulley 59 and the fixing portion 62 of the base 1 becomes (L−50) mm, as shown in FIG. 4. That is, the pulley 59 and the support bracket 23 have moved leftward in the diagram by 50 mm.

With regard to the left side of the slider 13, the length of the belt 61 between the pulley 57 and the slider 13 becomes (L'−50) mm, while the length of the belt 61 between the pulley 57 and the base 1 becomes (L'+50) mm, as shown in FIG. 5. That is, the pulley 57 and the support bracket 21 have moved leftward in the diagram by The action of the above-described structure will now be described. Suppose that the servo motor 9 has been rotated in the proper direction to move the slider 13 leftward in FIG. 1. As the slider 13 moves, the support brackets 21 and 23 move in the same direction at a half the moving speed of the slider 13 by the above-described actions of the pulleys 51 and 53, the belt 55, the pulleys 57 and 59, and the belt 61.

The same is true of the case where the servo motor 9 is rotated in the reverse direction to move the slider 13 rightward in FIG. 1. In this case, the support brackets 21 and 23 move in the same direction at a half the moving speed of the slider 13 by the actions of the pulleys 51 and 53, the belt 55, the pulleys 57 and 59, and the belt 61.

The above-discussed operation is repeated. As the ball screw 3 is supported by the pair of support brackets 21 and 23, the natural frequency f of the ball screw 3 becomes higher so that the allowable number of rotations n of the ball screw 3 can be increased. In other words, it is possible to improve the machine speed.

This embodiment has the following advantages. First, the desired support performance can be attained without complicating the structure of the actuator or enlarging the actuator. This support performance can be accomplished simply by arranging the support brackets 21 and 23 on both sides of the slider 13 and coupling those support brackets 21 and 23 via the pulleys 51, 53, 57 and 59 and the belts 55 and 61.

In addition, unlike the prior art, this embodiment needs no structure for retracting and protracting the intermediate support.

Figure 14:
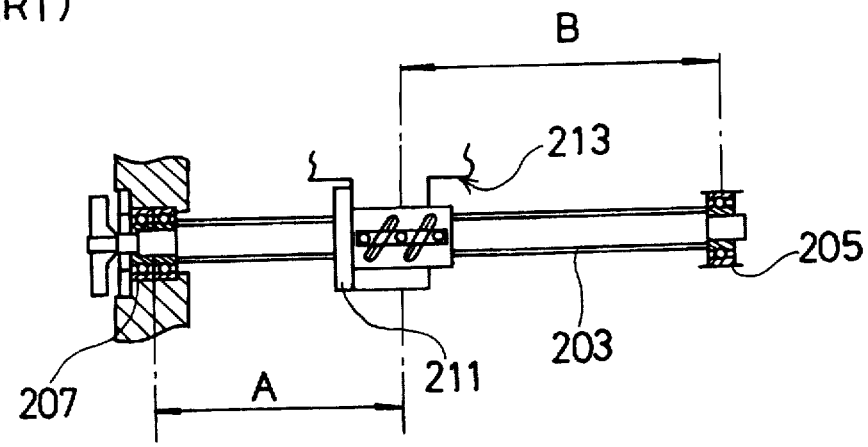
FIG. 14 is a diagram showing the general structure of the actuator according to the prior art for explaining the natural frequency.
Figure 15:
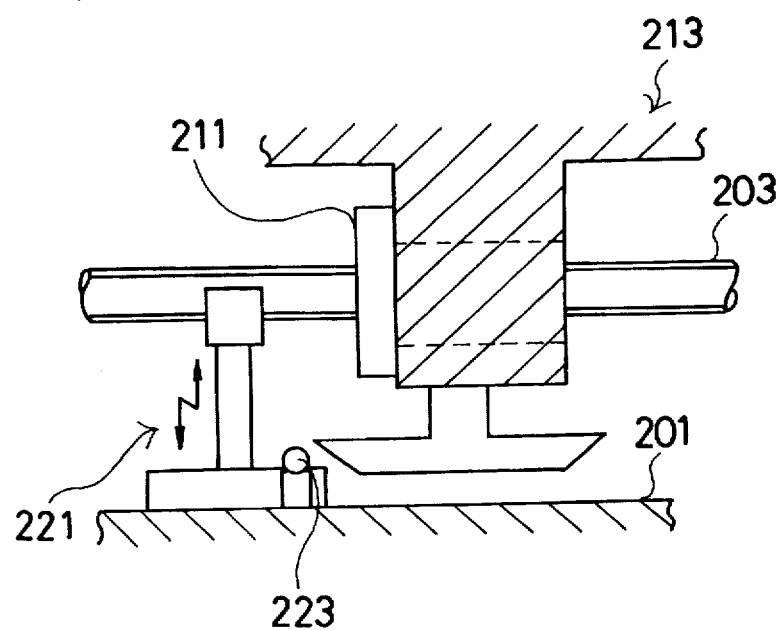
FIG. 15 is a diagram showing a structure for supporting a ball screw by means of an intermediate support according to prior art.

According to this embodiment, the slider 13 is designed not to hit against the support brackets 21 and 23 to move them, and the support brackets 21 and 23 move at a half the acceleration/deceleration of the slider 13 in synchronism with acceleration/deceleration of the slider 13. Accordingly, the actuator operates smoothly and does not suffer any vibration and noise, which would have otherwise been produced by the impact of the fast-moving slider on the support members in the prior art. The support brackets 21 and 23 are so set as to be positioned respectively between the bearing member 5 and the slider 13 and between the bearing member 7 and the slider 13, while the slider 13 is positioned just midway between the bearing members 5 and 7. When the slider 13 moves to the position where the distance B between attached points in FIG. 14 which has been used to explain the prior art becomes maximum, the support brackets are located at the position where their amplitudes would be large (B/2) if their middle portions were not supported. But, the shaft of the ball screw 3 is actually supported at that position, and the primary vibration of the shaft is effectively suppressed so that the allowable number of rotations of the ball screw 3 can be increased.

Second Embodiment

The second embodiment of this invention will now be described with reference to FIGS. 6 through 10. The same reference numerals used for the components of the first embodiment are also given to corresponding or identical components of the second embodiment so that the repetition of their descriptions can be avoided.

The first embodiment is so designed as to properly operate when the slider 13 and the support brackets 21 and 23 are in the range where the slider 13 does not contact the support brackets 21 and 23 and the support brackets 21 and 23 do not contact the bearing members 5 and 7. Let us consider this mechanism in the case where the slider 13 tries to advance further.

Figure 6:
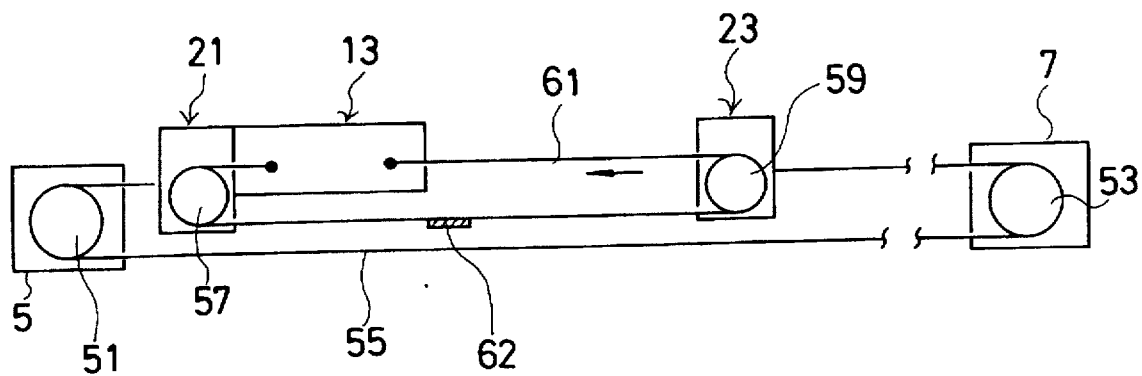
FIG. 6 is a diagram for explaining a second embodiment of this invention and the state where support brackets abut on the slider, but not on bearing members in the first embodiment.
Figure 7:
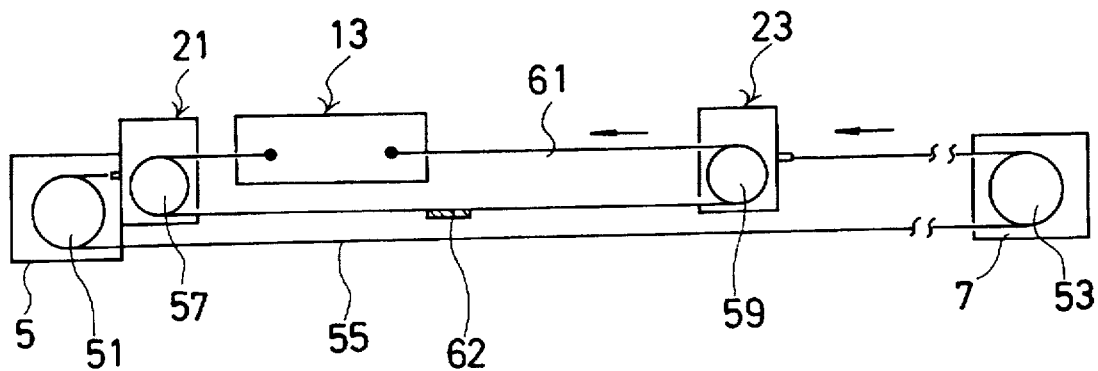
FIG. 7 is a diagram for explaining a second embodiment of this invention and the state where support brackets abut on the bearing members, but not on the slider in the first embodiment.

In the case where the slider 13 moves leftward in FIG. 6 and the support bracket 21 and the slider 13 contact each other first, if the slider 13 tries to move further, abnormal force acts on the portion of the belt 61 between the point on the right side of the slider 13 in FIG. 6 and the fixing portion 62 because the belt 61 is secured at this fixing portion 62. In the case where the bearing member 5 and the support bracket 21 contact each other first as shown in FIG. 7, as opposed to the above case, even if the slider 13 tries to move leftward further, the movement of the support bracket 23 is restricted by the belt 55 which is coupled to the support bracket 21 that has already contacted the bearing member 5 and has stopped. The tension equivalent to the moving force of the slider 13 acts on the portion of the belt 61 between the point on the right side of the slider 13 in FIG. 7 and the fixing portion 62. Further, the load of twice the moving force of the slider 13 acts as tension on the belt 55.

If the bearing members 5 and 7, the support brackets 21 and 23 and the slider 13 contact with one another simultaneously, the above situation can be avoided. While this phenomenon is geometrically possible, actually, it is very unlikely to cause such simultaneous contact. For example, the original positions of the actuator may be detected by the mechanism which allows the slider 13 to be pressed against the bearing members 5 and 7 via the respective support brackets 21 and 23 at the respective ends of its movable range and detects the ends (the original positions of the actuator) as the slider 13 is stopped. In this case, the bearing members 5 and 7, the support brackets 21 and 23 and the slider 13 cannot be expected to contact one another simultaneously, as mentioned above. Therefore, some tension inevitably acts on the belt 55.

According to the first embodiment, therefore, to prevent the aforementioned simultaneous contact, the moving range of the slider 13 should be restricted and the stopper blocks (not shown), for example, should be provided on the slider 13 and the base 1 to permit the use of the actuator within the range where the support brackets 21 and 23 do not contact the slider 13 and the bearing members 5 and 7.

The second embodiment is designed in such a manner as to prevent the support brackets 21 and 23 from abutting on the bearing members 5 and 7 and the slider 13 and to prevent new tension being applied on the belts 55 and 61.

Figure 8:
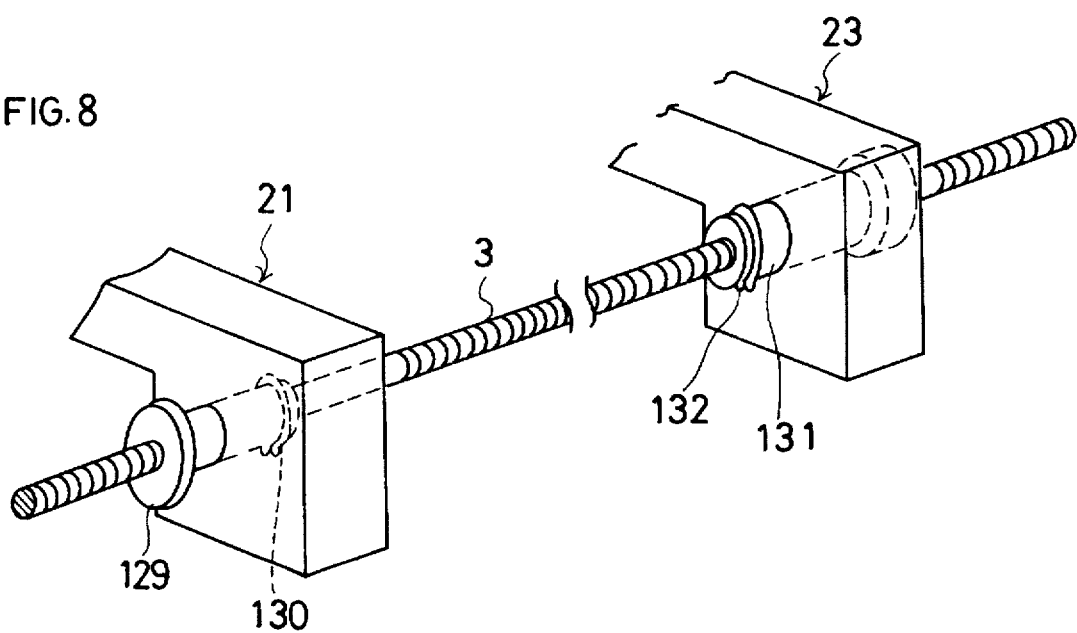
FIG. 8 is a perspective view showing the structure of the support brackets in the second embodiment.
Figure 9:
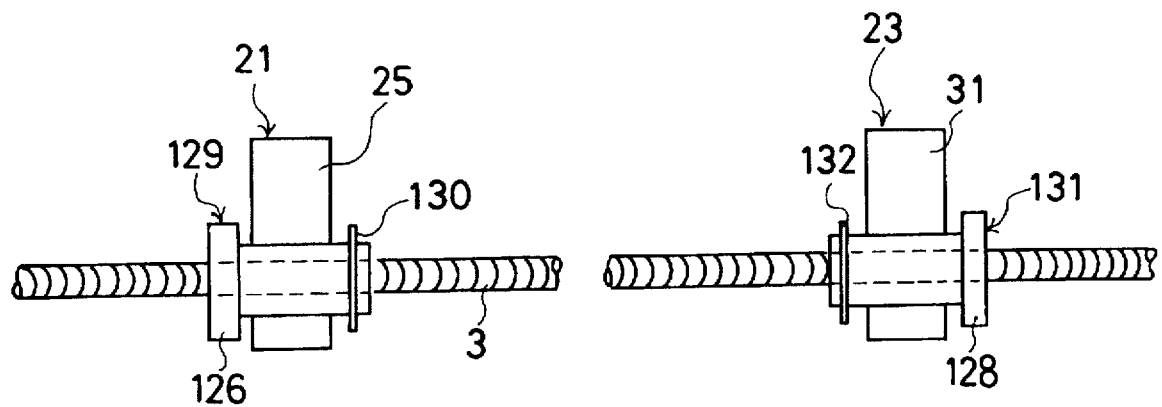
FIG. 9 is a cross-sectional view showing the structure of the support brackets in the second embodiment.
Figure 10:
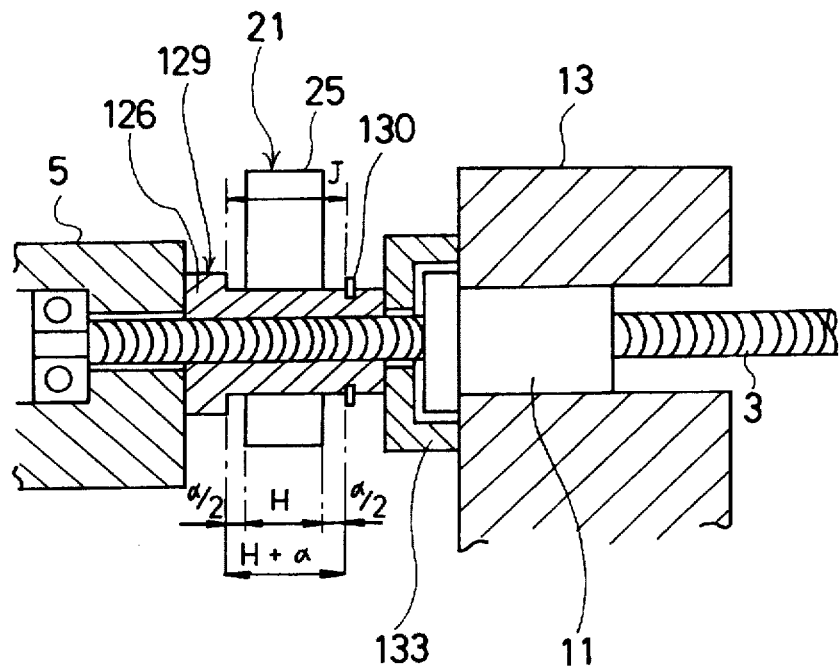
FIG. 10 is a diagram for explaining the second embodiment and the state where the slider and bearing members hit against each other via support bushings and no axial directional load is applied to the support brackets.

According to this embodiment, as shown in FIGS. 8 through 10, support bushings 129 and 131 which are movable in the axial direction within a given range, are provided in place of the support bushings 29 and 35 secured as feed screw supports to the support brackets 21 and 23 in the first embodiment, and stopper rings 130 and 132 are provided for restricting the moving ranges of the support bushings 129 and 131. The support bushings 129 and 131 are freely movable in the proper range (which differs depending on the size of the mechanism but is normally from several millimeters to about 10 mm) in the feeding direction to the support bracket bodies 25 and 31, and which support the screw shaft. The support bushings 129 and 131 respectively have flanges 126 and 128.

Because the mechanism for moving the support brackets at a half the moving speed of the slider is the same as that of the first embodiment, its description will be omitted.

The feature of this embodiment lies in that as shown in FIG. 10, the bearing member 5 contacts the slider (in this case a stopper flange 133 attached to the slider 13) via the support bushing 129 at one moving end, and the axial directional length H of the bracket body 25 of the support bracket 21 and the effective axial moving distance J of the support bushing 129 (the distance between the flange 126 and the stopper ring 130) satisfy the relationship expressed by the following equation (III).

$$J = H + \alpha \qquad (III)$$

If the lengths of the belts 55 and 61 are set in such a manner that an interval of about $\alpha/2$ is kept between the support bushing 129 and the bracket body 25 of the support bracket 21 in the axial direction, when the servo motor 9 tries to rotate further in this situation, i.e., when the slider 13 tries to move further, no new load is applied to each belt unlike in the first embodiment. The same is true of the other support bracket (23) side. Therefore, it becomes easier to make the positional adjustment among the slider 13, the support brackets 21 and 23, and the bearing members 5 and 7. If the positional adjustment is so made as to allow the slider 13, the support brackets 21 and 23, and the bearing members 5 and 7 to contact one another at the same time, even a slight error in their positional adjustment can be compensated by the axial movement of the support bushings 129 and 131.

Third Embodiment

Figure 11:
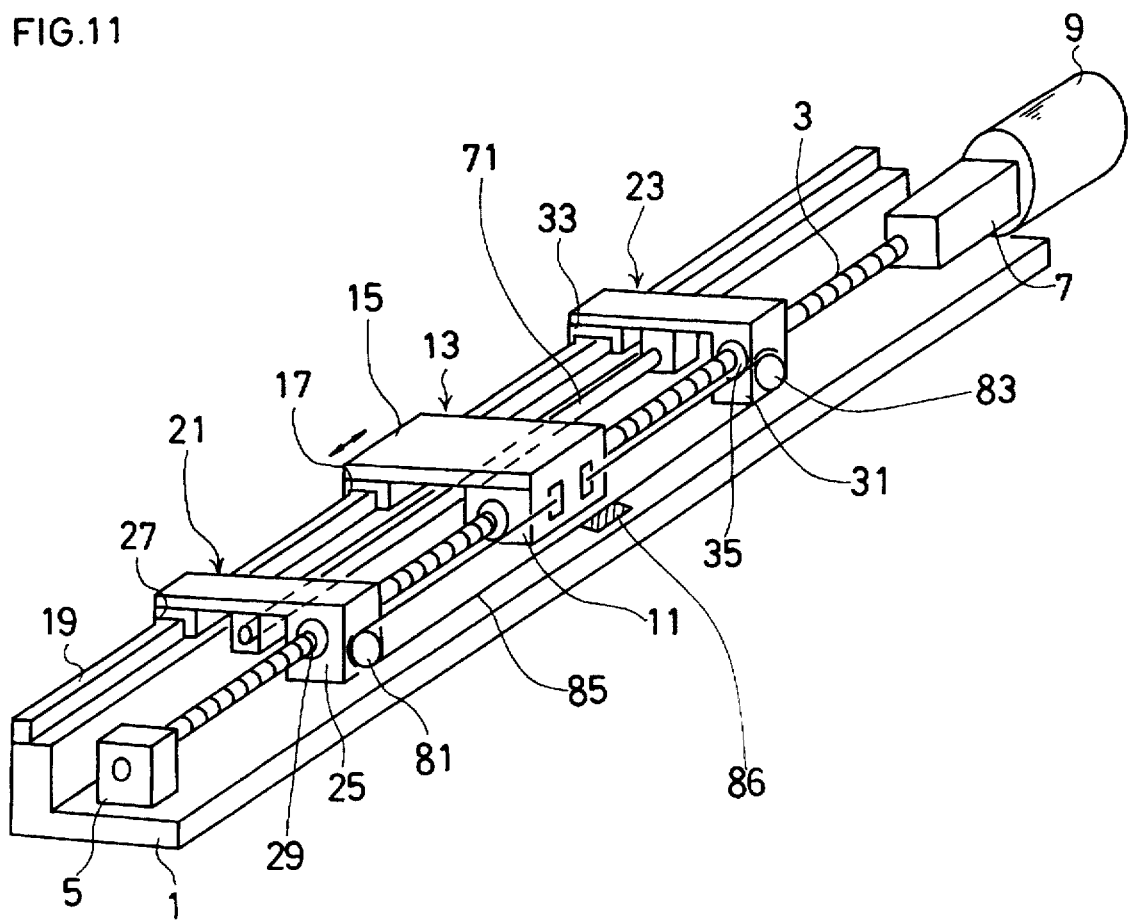
FIG. 11 is a perspective view showing the general structure of an actuator according to a third embodiment of this invention.
Figure 12:
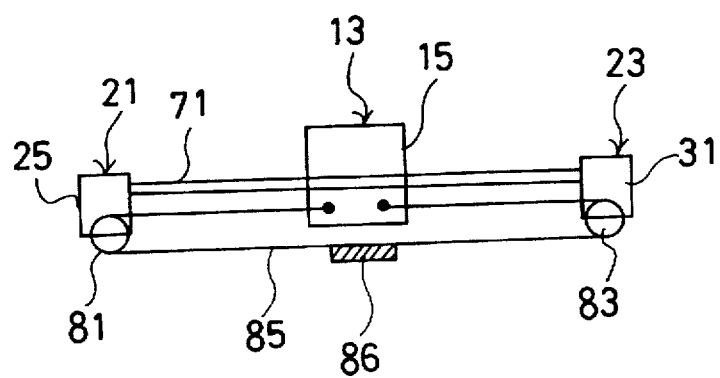
FIG. 12 is a diagram exemplarily showing the structure of a part of the actuator according to the third embodiment of this invention.
Figure 13:
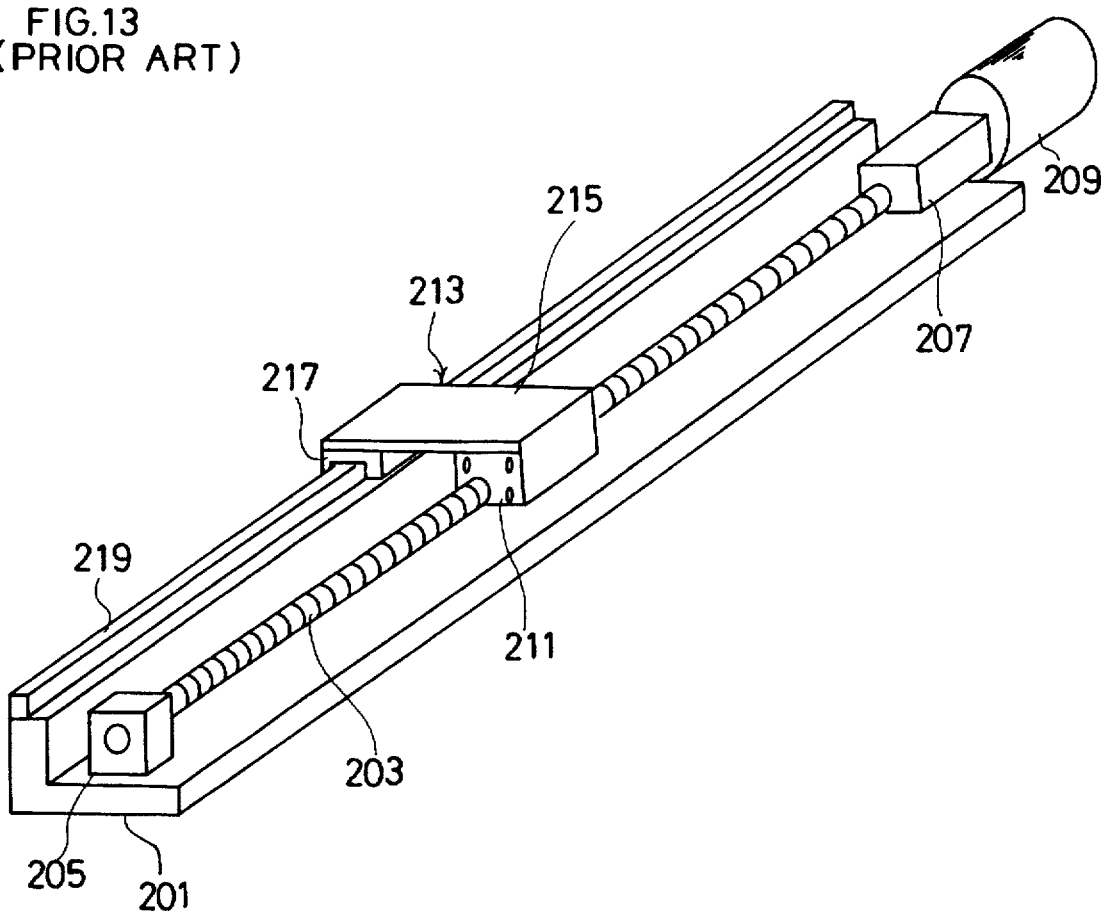
FIG. 13 is a perspective view showing the general structure of an actuator according to prior art.

The third embodiment of this invention will now be described with reference to FIGS. 11 and 12. Like or same reference numerals used for the components of the first embodiment, are also given to corresponding or identical components of the third embodiment, so that the repetition of their descriptions can be avoided.

The support brackets 21 and 23 are coupled together by a rod member 71 as the first coupling means. A pulley 81 is attached to the bracket body 25 of the support bracket 21 and a pulley 83 is attached to the bracket body 31 of the support bracket 23. A belt 85 is put around those pulleys 81 and 83. This belt 85 has both ends coupled to the slider body 15 of the slider 13 and has its center portion secured to the base 1. The fixing portion is indicated by reference numeral "86" in FIGS. 11 and 12. The fixing method is the same as has already been explained in the section of the first embodiment.

The action of the above-described structure will now be described. Suppose that the servo motor 9 has been rotated in the proper direction to move the slider 13 leftward in FIG. 10. As the slider 13 moves leftward in FIG. 10, the support brackets 21 and 23 move in the same direction at a half the moving speed of the slider 13 by the actions of the pulleys 81 and 83 and the belt 85. As the support brackets 21 and 23 are coupled via the rod member 71, both support brackets 21 and 23 move with the same interval always kept therebetween.

The same is true of the case where the servo motor 9 is rotated in the reverse direction to move the slider 13 rightward in FIG. 10.

This embodiment can therefore have the same advantages as the first embodiment.

As the support brackets 21 and 23 are coupled via the rod member 71, this embodiment exhibits surer operational synchronization than the first embodiment.

In the third embodiment like in the second embodiment, the support bushings 29 and 35 may be designed to be movable in the axial direction to prevent a new load from acting on the belt at the moving ends.

This invention is not limited to the above-described embodiments. For example, the structure of the coupling means which comprises the first coupling means and second coupling means is not limited to those of the abovedescribed embodiments. Although a ball screw is used as a feed screw and a ball nut is used as a feed nut in the individual embodiments, the feed screw and feed nut should not necessarily be limited to the illustrated types. For example, this invention is also effective when a square screw, a trapezoidal screw or the like is used. The same is true of the shape of the support members. The structure of the coupling means which comprises the first coupling means and second coupling means is not limited to that of the first and second embodiments; for example, sprockets and chains may be used in place of the pulleys and belts. Although the pulleys 51 and 53 as rotary bodies are respectively attached to a pair of bearing members 5 and 7 in the first and second embodiments, they may be attached to the base 1 or may be attached to other members (not shown) which are to be attached to the base 1.

What is claimed is:

1. An actuator comprising:

a feed screw having both ends respectively supported in a rotatable manner by a pair of bearing members arranged on a base;

a rotary driver for rotating said feed screw in a proper direction;

a feed nut engaged with said feed screw with rotation thereof being restricted by said feed screw, and movable in accordance with rotation of said feed screw;

a slider attached to said feed nut;

a pair of support members, located midway between said slider and said bearing members on both sides of said slider and movable in a feeding direction, for supporting said feed screw while positions of said support members are restricted in a direction perpendicular to said feeding direction; and coupling means for coupling said base, said slider and said pair of support members in such a manner that when said slider moves, a moving speed of said pair of support members becomes a half of that of said slider, wherein said coupling means comprises:

first coupling means, including a pair of first rotary bodies rotatably secured to both end portions of said base in said feeding direction and a first thread member placed around said pair of first rotary bodies and having both ends coupled to said pair of support members; and second coupling means, including a pair of second rotary bodies rotatably secured to said pair of support members and a second thread member placed around said pair of second rotary bodies and having both ends coupled to said slider and a center portion secured to said base.

2. An actuator as claimed in claim 1, wherein each of said support members comprises a support member body, a guide section attached to said support member body and movably engaged with a rail laid on said base, and a feed screw support attached to said support member body, said feed screw penetrating said feed screw support.

3. An actuator as claimed in claim 1, wherein each of said support members comprises a support member body, a guide section attached to said support member body and movably engaged with a rail laid on said base, and a feed screw support attached to said support member body in such a way as to be movable in an axial direction, relative to said support member body within a predetermined range, said feed screw penetrating said feed screw support; and said bearing members and said slider abut on each other via said feed screw supports of said support members at moving ends while said support member bodies contact neither said bearing members nor said slider.

4. An actuator as claimed in claim 3, wherein each of said feed screw supports has a flange on one end side and a stopper ring on the other end side, given that distances between said flanges and said stopper rings are J and axial lengths of said support member bodies are H, J=H+α is satisfied, and said support member bodies and said feed screw supports are movable in a relative fashion within a range of said α.

5. An actuator as claimed in claim 4, wherein lengths of said thread members of said first coupling means and said second coupling means are determined in such a way that distances between said support member bodies and said flanges and distances between said support member bodies and said stopper rings become ½α.

6. An actuator comprising:

a feed screw having both ends respectively supported in a rotatable manner by a pair of bearing members arranged on a base;

a rotary driver for rotating said feed screw in a proper direction;

a feed nut engaged with said feed screw with rotation thereof being restricted by said feed screw, and movable in accordance with rotation of said feed screw;

a slider attached to said feed nut;

a pair of support members, located midway between said slider and said bearing members on both sides of said slider and movable in a feeding direction, for supporting said feed screw while positions of said support members are restricted in a direction perpendicular to said feeding direction;

coupling means for coupling said base, said slider and said pair of support members in such a manner that when said slider moves, a moving speed of said pair of support members becomes a half of that of said slider, wherein said coupling means comprises first coupling means which is a rod member for coupling said pair of support members, and second coupling means including a pair of rotary bodies rotatably secured to said pair of support members and a thread member placed around said pair of rotary bodies and having both ends coupled to said slider and a center portion secured to said base;

wherein each of said support members comprises a support member body, a guide section attached to said support member body and movably engaged with a rail laid on said base, and a feed screw support attached to said support member body in such a way as to be movable in an axial direction, relative to said support member body within a predetermined range, said feed screw penetrating said feed screw support; and said bearing members and said slider abut on each other via said feed screw supports of said support members at moving ends while said support member bodies contact neither said bearing members nor said slider; and wherein each of said feed screw supports has a flange on one end side and a stopper ring on the other end side, given that distances between said flanges and said stopper rings are J and axial lengths of said support member bodies are H, J=H+α is satisfied, and said support member bodies and said feed screw supports are movable in a relative fashion within a range of said α.

7. An actuator as claimed in claim 6, wherein a length of said thread member of said said second coupling means is determined in such a way that distances between said support member bodies and said flanges and distances between said support member bodies and said stopper rings become ½α.

8. An actuator comprising:

a feed screw having both ends respectively supported in a rotatable manner by a pair of bearing members arranged on a base;

a rotary driver for rotating said feed screw in a proper direction;

a feed nut engaged with said feed screw with rotation thereof being restricted by said feed screw, and movable in accordance with rotation of said feed screw;

a slider attached to said feed nut;

a pair of support members, located midway between said slider and said bearing members on both sides of said slider and movable in a feeding direction, for supporting said feed screw while positions of said support members are restricted in a direction perpendicular to said feeding direction;

first coupling means, including a pair of rotary bodies rotatably secured to both end portions of said base and having a thread member placed around said pair of rotary bodies with both ends of said thread member respectively coupled to said support members; and second coupling means for coupling said slider to said support members, said second coupling means being secured to said base, and said first and second coupling means being independent elements of one another but coacting to cause a moving speed of said pair of support members to become a half of that of said slider.

* * * * *